United States Patent
Soejima et al.

(10) Patent No.: US 6,880,899 B2
(45) Date of Patent: Apr. 19, 2005

(54) BRAKING FORCE CONTROL SYSTEM FOR VEHICLE

(75) Inventors: Yuji Soejima, Tokyo (JP); Tohru Akiyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/716,911

(22) Filed: Nov. 19, 2003

(65) Prior Publication Data

US 2004/0130209 A1 Jul. 8, 2004

Related U.S. Application Data

(62) Division of application No. 09/842,069, filed on Apr. 26, 2001.

(30) Foreign Application Priority Data

Apr. 26, 2000 (JP) .................................. P. 2000-126382

(51) Int. Cl.[7] .................................................. B60T 8/60
(52) U.S. Cl. ..................... 303/146; 303/147; 303/113.5
(58) Field of Search ................................ 303/146, 147, 303/155, 186, 113.5, 113.4

(56) References Cited

U.S. PATENT DOCUMENTS

| | | | |
|---|---|---|---|
| 4,881,785 A | | 11/1989 | Ushijima et al. |
| 4,902,076 A | | 2/1990 | Ushijima et al. |
| 4,917,444 A | | 4/1990 | Ishido et al. |
| 5,488,557 A | * | 1/1996 | Matsuda ...................... 701/75 |
| 5,632,535 A | | 5/1997 | Luckevich et al. |
| 5,669,677 A | | 9/1997 | Fischer |
| 5,865,513 A | | 2/1999 | Inagaki et al. |
| 6,280,003 B1 | | 8/2001 | Oshiro et al. |
| 6,322,167 B1 | * | 11/2001 | Pruhs et al. ................. 303/146 |
| 6,491,358 B1 | * | 12/2002 | Soejima et al. ............. 303/146 |

FOREIGN PATENT DOCUMENTS

| | | |
|---|---|---|
| DE | 19651460 | 6/1998 |
| DE | 42 15 710 C2 | 12/1998 |
| DE | 199 59 129 A1 | 6/2000 |
| JP | 10-119744 | 5/1988 |
| JP | 04339065 A | 11/1992 |
| JP | 2000168534 A | 6/2000 |

* cited by examiner

Primary Examiner—Matthew C. Graham
Assistant Examiner—Mariano Sy
(74) Attorney, Agent, or Firm—Smith, Gambrell & Russell, LLP

(57) ABSTRACT

In a vehicle having an ABS control system, a braking control of a right and left rear wheels can be independently carried out when a lateral acceleration exceeds a lateral acceleration value set beforehand. When the ABS control is operated at one of the right and left rear wheels, the control system executes a stepwise pressure increase control which provides a stepwise pressure increase for the other rear wheel up to a braking pressure to be reached at a start of the control.

9 Claims, 5 Drawing Sheets

BRAKING FORCE CONTROL SYSTEM FOR VEHICLE

CROSS-REFERENCE TO RELATED APPLICATIONS

This application is a division of application Ser. No. 09/842,069 filed on Apr. 26, 2001, which is relied on and incorporated herein by reference.

BACKGROUND OF THE INVENTION

1. Field of the Invention

The present invention relates to a braking force control system of a vehicle which adequately distributes the braking force in braking.

2. Description of the Related Art

In recent years, there have been proposed various braking control systems which make use of constitutions of anti-lock braking systems (ABS) and control distribution of braking force in normal braking to be more adequate one.

For example, in JP-A-10-119744, there is disclosed one which independently increases, decreases or holds braking oil pressure of each of right and left rear wheels when deceleration of a vehicle reaches a specified value and when a vehicle speed exceeds a specified speed, so that braking force distribution between rear and front wheels becomes an approximately ideal one to perform independent braking control for carrying out sufficient braking.

Incidentally, in the ABS control and the braking force distribution control as described above which provide an independent braking for the rear wheel side, because of not so large transfer of a vertical load between the right side and left side wheels in a normal turning of the vehicle, an attitude of the vehicle does not change largely in rolling even when the brake is operated, so that the braking can be performed with a normal feeling of the rolling. However, in a high lateral acceleration turn on a high friction road, when the ABS control and braking force distribution control of the rear wheels are independently carried out, because of a large difference between the right and left vertical loads, there is a fear that unpleasant rolling behavior of the vehicle body is occurred due to a change in braking force of the turning outside rear wheel caused by each of the braking controls.

SUMMARY OF THE INVENTION

The present invention was made in view of the above with an object of providing a braking force control system of a vehicle which can carry out natural, reliable and stable braking without any particular addition of complicated mechanisms by preventing the occurrence of unpleasant rolling behavior. When a vehicle turns with a high lateral acceleration, the braking of each of the right and left rear wheels is independently controlled.

In order to achieve the above object, according to a first aspect of the present invention, there is provided a braking force control system of a vehicle, having: a lateral acceleration detecting unit detecting lateral acceleration of the vehicle; and a braking control unit carrying out an anti-lock braking control and carrying out an independent braking control of right and left rear wheels, wherein, in a case that the lateral acceleration exceeds a lateral acceleration value set beforehand, when the anti-lock braking control is operated at one of the right and left rear wheels, the braking control unit executes a stepwise pressure increase control for providing a stepwise pressure increase for the other rear wheel up to a braking pressure to be reached at a start of the control.

Namely, in the above-described braking force control system of a vehicle according to the first aspect of the invention, the lateral acceleration detecting unit detects lateral acceleration of the vehicle. Moreover, the braking control unit executes, when the lateral acceleration exceeds a lateral acceleration value set beforehand, stepwise pressure increase control which provides, when the anti-lock braking control is operated at one of the right and left rear wheels, a stepwise pressure increase for the other rear wheel up to a braking pressure to be reached at a start of the control. Therefore, at a high lateral acceleration turning, at a turning outside rear wheel for which operation of an anti-lock braking control is slowed due to an increase in a vertical load, a stepwise pressure increase control is started from the time of operation of the anti-lock braking control at a turning inside rear wheel. Thus, even the anti-lock braking control is operated at the turning outside rear wheel, no sudden strong braking is applied and unpleasant rolling behavior is prevented from occurrence to allow a natural, reliable, and stable braking to be performed. In addition, this can be applied by changing control of normal anti-lock braking control, so that the realization thereof is allowed without any particular addition of complicated mechanism.

Further, according to a second aspect of the present invention, there is provided a braking force control system of a vehicle, having: a lateral acceleration detecting unit detecting a lateral acceleration of the vehicle; and a braking control unit carrying out an anti-lock braking control and carrying out an independent braking control of right and left rear wheels, wherein the braking control unit executes a braking force distribution control between front and rear wheels as specified when the lateral acceleration exceeds a lateral acceleration value set beforehand, and when the anti-lock braking control is operated at one of the right and left rear wheels, the braking control unit stops the front and rear braking force distribution control of the other rear wheel and executes a stepwise pressure increase control thereof for providing a stepwise pressure increase up to a braking pressure to be reached at a start of the control.

Namely, in the above-described braking force control system of a vehicle as the second aspect, the lateral acceleration detecting unit detects lateral acceleration of the vehicle. Moreover, the braking control unit executes, when the lateral acceleration exceeds a lateral acceleration value set beforehand, braking force distribution control between front and rear wheels as specified, and along with this, when the above anti-lock braking control is operated at one of the right and left rear wheels, stops the front and rear braking force distribution control of the other rear wheel and executes stepwise pressure increase control thereof which provides a stepwise pressure increase up to a braking pressure to be reached at a start of the control. Therefore, at high lateral acceleration, the front and rear braking force distribution control is first carried out at the turning inside rear wheel with subsequently started anti-lock braking control. Also in the turning outside rear wheel, the front and rear braking force distribution control is started subsequent to the turning inside rear wheel. However, when the anti-lock braking control is started at the turning inside rear wheel in the course of the front and rear braking force distribution control, the front and rear braking force distribution control is stopped for the stepwise pressure increase control being executed. In this way, at the turning inside rear wheel, after the front and rear braking force distribution control, the control is transferred to the anti-lock braking control. While, at the turning outside rear wheel, after the front and rear braking force distribution control, the control is transferred to the anti-lock braking control through the stepwise pressure increase control. Thus, even the anti-lock braking control is operated at the turning outside rear wheel, no sudden strong braking is applied and unpleasant rolling behavior is prevented from occurrence to allow a natural, reliable, and stable braking to be performed. In addition, this can be applied by changing control of normal anti-lock braking control, so that the realization thereof is allowed without any particular addition of complicated mechanism.

Furthermore, in the braking force control system of a vehicle according to the second aspect of the present invention, the front and rear braking force distribution control is started and executed depending on a slipping condition of the rear wheel.

DETAILED DESCRIPTION OF THE PREFERRED EMBODIMENTS

Preferred embodiments of the present invention will be explained below on the basis of the drawings. FIGS. 1 to 4 shows a first embodiment of the present invention.

Figure 2:
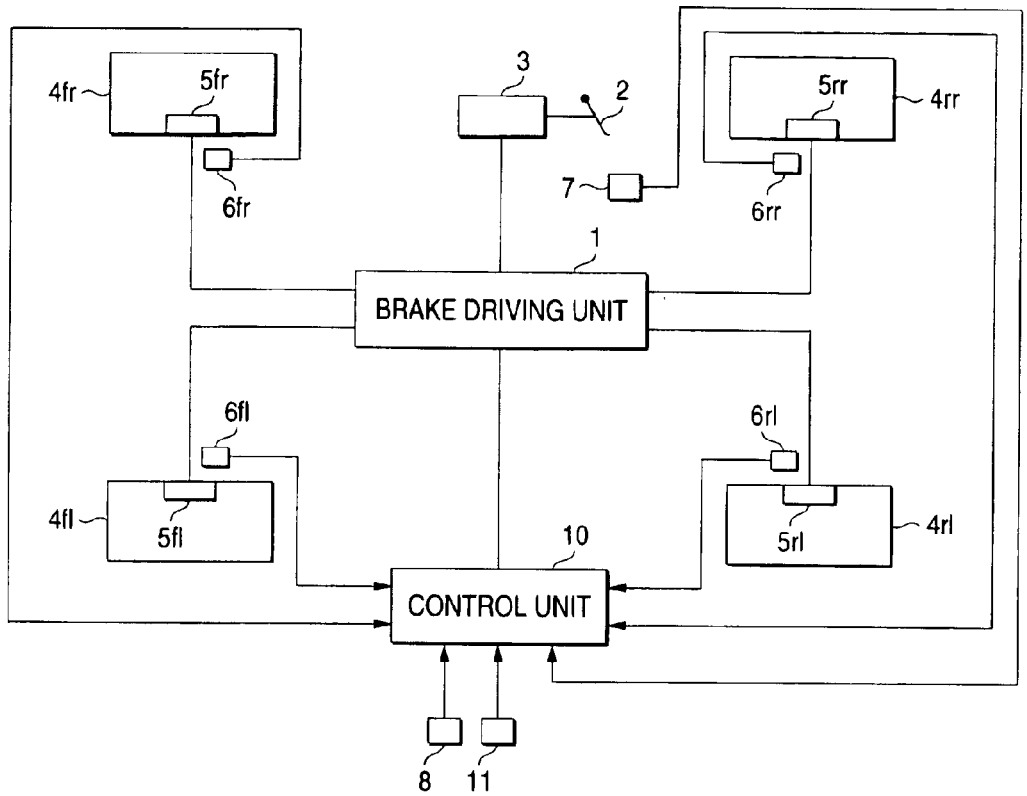
FIG. 2 is a schematic explanatory diagram of the whole braking force control system according to the same.

In FIG. 2, the reference numeral 1 denotes a brake driving unit. The brake driving unit 1 is connected to a master cylinder 3 which is connected to a brake pedal 2 operated by a driver. When the driver operates the brake pedal 2, the master cylinder 3 applies braking pressures through the above-described brake driving unit 1 to respective wheel cylinders (a left front wheel cylinder 5fl, a right front wheel cylinder 5fr, a left rear wheel cylinder 5rl, and a right rear wheel cylinder 5rr) of four wheels (a left front wheel 4fl, a right front wheel 4fr, a left rear wheel 4rl, and a right rear wheel 4rr), by which brakes are applied to the four wheels.

The brake driving unit 1 is a hydraulic unit provided with a pressurizing source, a pressure reducing valve, a pressure increasing valve and an oil pump etc. The brake driving unit 1 constitutes so as to freely introduce the braking pressure independently to each of the wheel cylinders 5fl, 5fr, 5rl, and 5rr in response to input signals from a control unit 10 described later.

The respective wheels 4fl, 4fr, 4rl, and 4rr are structured so as to have their wheel speed detected by respective wheel speed sensors (a left front wheel speed sensor 6fl, a right front wheel speed sensor 6fr, a left rear wheel speed sensor 6rl, and a right rear wheel speed sensor 6rr). In the first embodiment, a vehicle speed V is to be obtained by calculating an average of the wheel speeds.

To the control unit 10, there are connected the wheel speed sensors 6fl, 6fr, 6rl, and 6rr, a brake switch 7 for detecting ON and OFF of the brake pedal 2, and a lateral acceleration sensor 8 as a lateral acceleration detecting unit for detecting the lateral acceleration Gy of the vehicle.

The control unit 10 has a micro computer and the auxiliary control circuits and, when the brake pedal 2 is stepped on to be made ON (when the brake switch 7 is made ON), executes a later described braking control program in response to the respective input signals so as to output a control signal to the above brake driving unit 1 for carrying out braking control of the vehicle.

Figure 3:
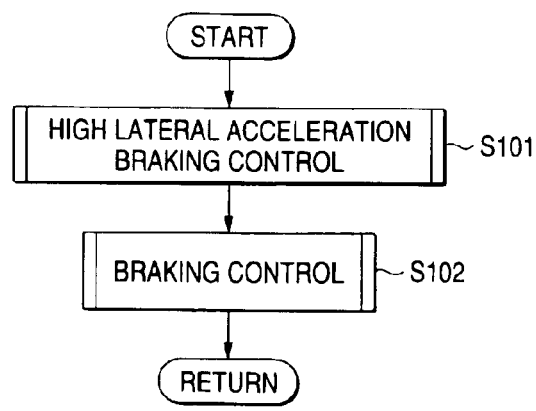
FIG. 3 is a flow chart of a braking control program according to the same.

The above-described braking control program, as shown in a flowchart in FIG. 3, first carries out at step (hereinafter abbreviated as "S") 101, high lateral acceleration braking control, and at S102, carries out other (other than at the high lateral acceleration) braking control.

The lateral acceleration braking control at S101 is carried out in accordance with a later described high lateral acceleration braking control routine. According to the control at S101, when the lateral acceleration Gy exceeds a lateral acceleration value set beforehand, stepwise pressure increase control is executed which provides, when the ABS control is operated at one of the right and left rear wheels, a stepwise pressure increase for the other rear wheel up to a braking pressure to be reached at a start of the control.

Moreover, the braking control at S102 is executed as, for example, independent braking control which independently controls a braking force of each of the right and left wheels on the front wheel side depending on the slipping condition of each wheel and controls with the rear wheel side as below depending on the lateral acceleration Gy and a longitudinal acceleration Gx (detected by a longitudinal acceleration sensor 11).

For example, a region of the lateral acceleration Gy other than a high lateral acceleration region (for example, a region below 6.89 m/s$^2$) is divided into three regions (for example, regions from 6.89 to 4.41 m/s$^2$, from 4.41 to 2.94 m/s$^2$, and below 2.94 m/s$^2$). In a region with the lateral acceleration Gy being from 6.89 to 4.41 m/s$^2$, independent braking control is carried out on the rear wheel side which independently controls braking forces of the right and left wheels depending on respective slipping conditions thereof. Moreover, in a region with the lateral acceleration Gy from 4.41 to 2.94 m/s$^2$, when the longitudinal acceleration Gx is below 6.87 m/s$^2$, the independent braking control is carried out on the rear wheel side. And when the longitudinal acceleration Gx is 6.87 m/s$^2$ or above, a select low control is carried out on the rear wheel side which controls braking forces of the right and left wheels depending on a wheel on the side with a large slipping condition. Furthermore, in a region with the lateral acceleration Gy below 2.94 m/s$^2$, when the longitudinal acceleration Gx is below 6.87 m/s$^2$, the select low control is carried out on the rear wheel side and, when the longitudinal acceleration Gx is 6.87 m/s$^2$ or above, the independent braking control is to be carried out on the rear wheel side.

As described above, in the first embodiment of the present invention, the control unit 10 is constituted with a function of a braking control unit.

Figure 1:
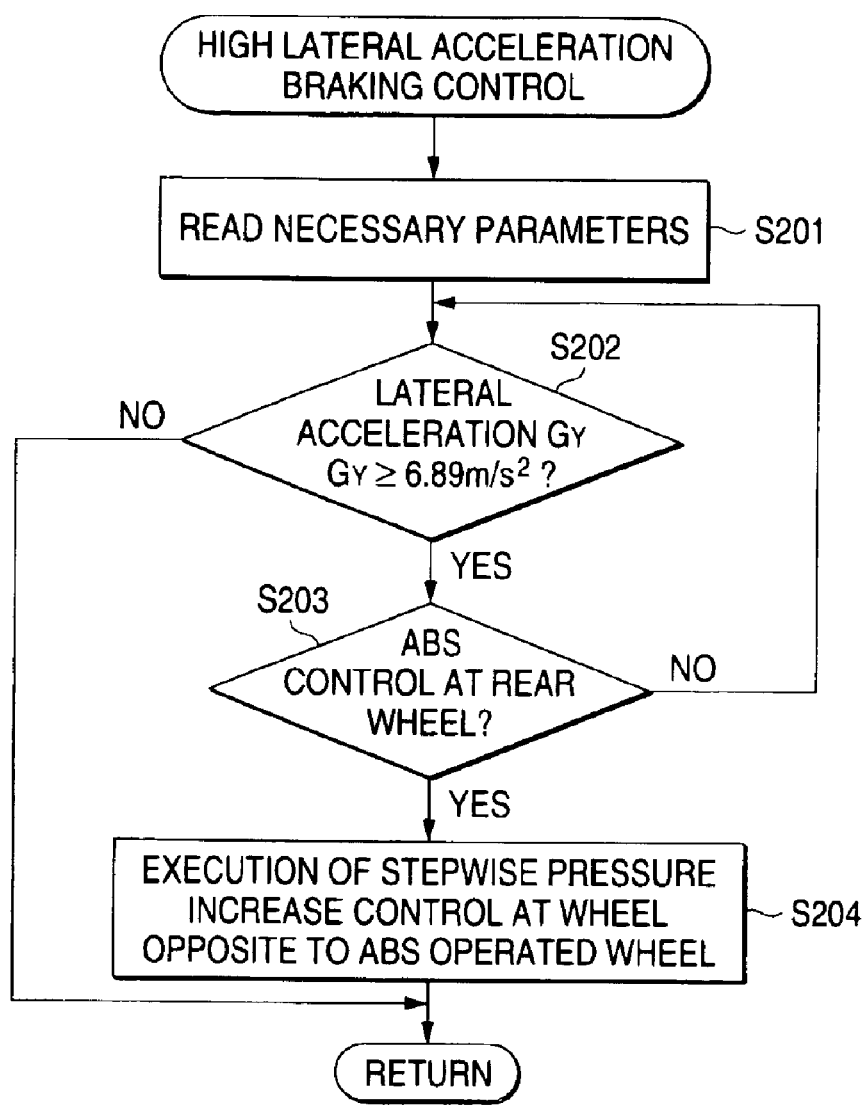
FIG. 1 is a flowchart of high lateral acceleration braking control according to a first embodiment of the present invention.

The high lateral acceleration braking control routine executed at S101, as shown in the flowchart of FIG. 1, first reads necessary parameters at S201, namely the lateral acceleration Gy from the lateral acceleration sensor 8 and an ABS control operation signal indicating operation or non-operation of the ABS control.

Next to this, the execution goes to S202 where comparison is carried out between the lateral acceleration Gy and a lateral acceleration value set beforehand to be a reference for deciding the high lateral acceleration (for example, 6.89 m/s$^2$). With the lateral acceleration Gy being below 6.89 m/s$^2$, the execution just goes out of the routine and proceeds to S102.

While, when the lateral acceleration Gy is decided to be 6.89 m/s$^2$ or above as being in high lateral acceleration running at S202, the execution goes to S203 where decision is made as to whether the ABS control is operated at any one of the right and left rear wheels or not. When no ABS control is operated at any of the right and left rear wheels, the execution returns to S202. When the ABS control is operated at any one of the right and left rear wheels, the execution goes to S204.

Here, the BS control in the first embodiment is performed by known control method, which performs calculations on a speed, an acceleration and a deceleration of each wheel, a simulatively calculated vehicle body speed and the like. The simulatively calculated vehicle body speed is a value calculated by making a decision of taking the case as a sudden braking in which case a brake pedal 2 is stepped on and a deceleration of the wheel speed is above a specified value, by setting the wheel speed at the time of the decision as an initial value, and by reducing thereafter the wheel speed therefrom with a specified deceleration. By judging from a comparison of the simulatively calculated vehicle body speed and the wheel speed, a magnitude of the acceleration or deceleration of the wheel and the like, one of three oil pressure modes of a pressure increase, a pressure hold, and a pressure decrease is selected when the ABS is operated. Specifically, when a slipping condition is exhibited as a result of increase in a difference between the simulatively calculated vehicle body speed and the wheel speed, the braking pressure at this time is taken as an estimated ABS operating pressure to carry out pressure reduction from the braking pressure. The reduced braking pressure is then held and increased as specified. When the pressure becomes the estimated ABS operating pressure to fall in the slipping condition again, the pressure is reduced to repeat the above, for which a selected specified braking control signal is outputted to the brake driving unit 1.

With the decision made at S203 as the ABS control is operated at any one of the right and left rear wheels, the execution going to S204 makes stepwise pressure increase control to be carried out which provides a stepwise pressure increase for the other wheel without ABS control operation up to a braking pressure to be reached (for example, an estimated ABS operating pressure), by finely repeating pressure increasing and holding only at a start of the control. After the stepwise pressure increase control, the execution goes out of the routine.

Figure 4:
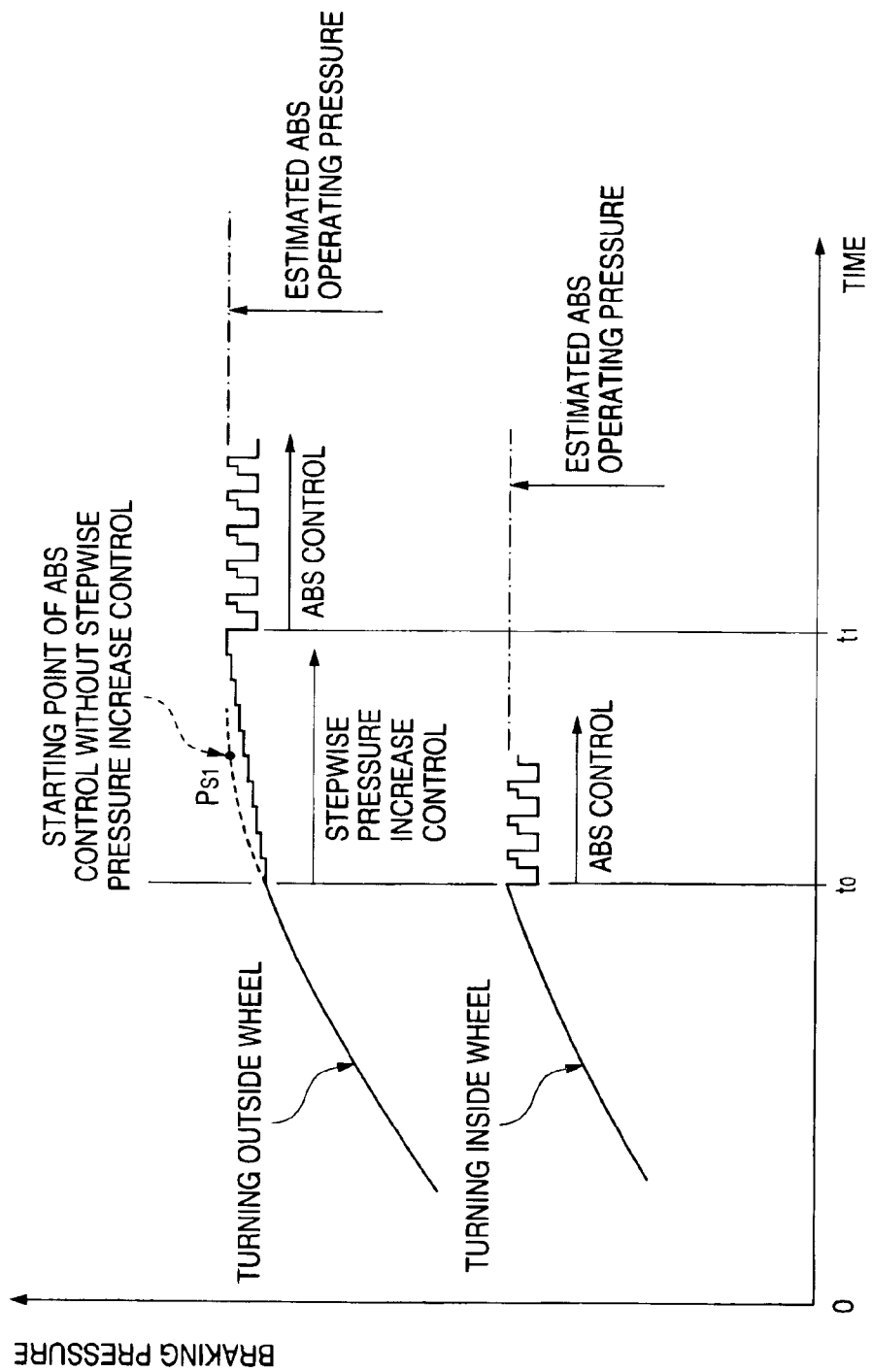
FIG. 4 is an explanatory diagram of variation in braking pressure with time at braking at a high lateral acceleration turning according to the same.

Under the above-described braking control, an example of variation in braking pressure with time at braking at a high lateral acceleration turning will be explained with reference to FIG. 4. In the example, the surface condition of a road (for example, a road surface friction coefficient is μ) is taken as being the same on the right wheel side and the left wheel side of the vehicle.

First, a vehicle just going to be braked in turning normally brings a turning inside wheel into a slipping condition easier than a turning outside wheel because the more vertical load of the vehicle is transferred to the turning outside wheel side. Thus, from a time t0 in the diagram, the ABS control is operated at the turning inside wheel.

As a result, the stepwise pressure increase control is executed at the turning outside wheel from the time t0, by which a braking pressure is increased stepwise up to an estimated ABS operating pressure. Then, with the time reaching to a time t1, the ABS control is executed also at the turning outside wheel. Therefore, no sudden impact due to a high vertical load is caused when the ABS control is operated at the turning outside wheel to prevent the occurrence of unpleasant rolling behavior to allow a natural, reliable, and stable braking to be performed. Moreover, this can be applied by only changing the software side of a conventional ABS control, so that the realization thereof is allowed without any particular addition of complicated mechanism.

Next, a description will be given of a second embodiment of the present invention with reference to FIG. 5 and FIG. 6. Incidentally, the second embodiment is a variation of the high lateral acceleration braking control in the first embodiment.

Namely, the lateral acceleration braking control at S101 in the braking control program explained in the first embodiment is carried out in accordance with a later described high lateral braking control routine. The braking force distribution control is executed between front and rear wheels as specified when the lateral acceleration Gy exceeds a lateral acceleration value set beforehand. And, along with this, when the ABS control is operated at one of the right and left rear wheels, the front and rear braking force distribution control of the other rear wheel is stopped and stepwise pressure increase control thereof is executed which provides a stepwise pressure increase up to a braking pressure to be reached at a start of the control.

Figure 5:
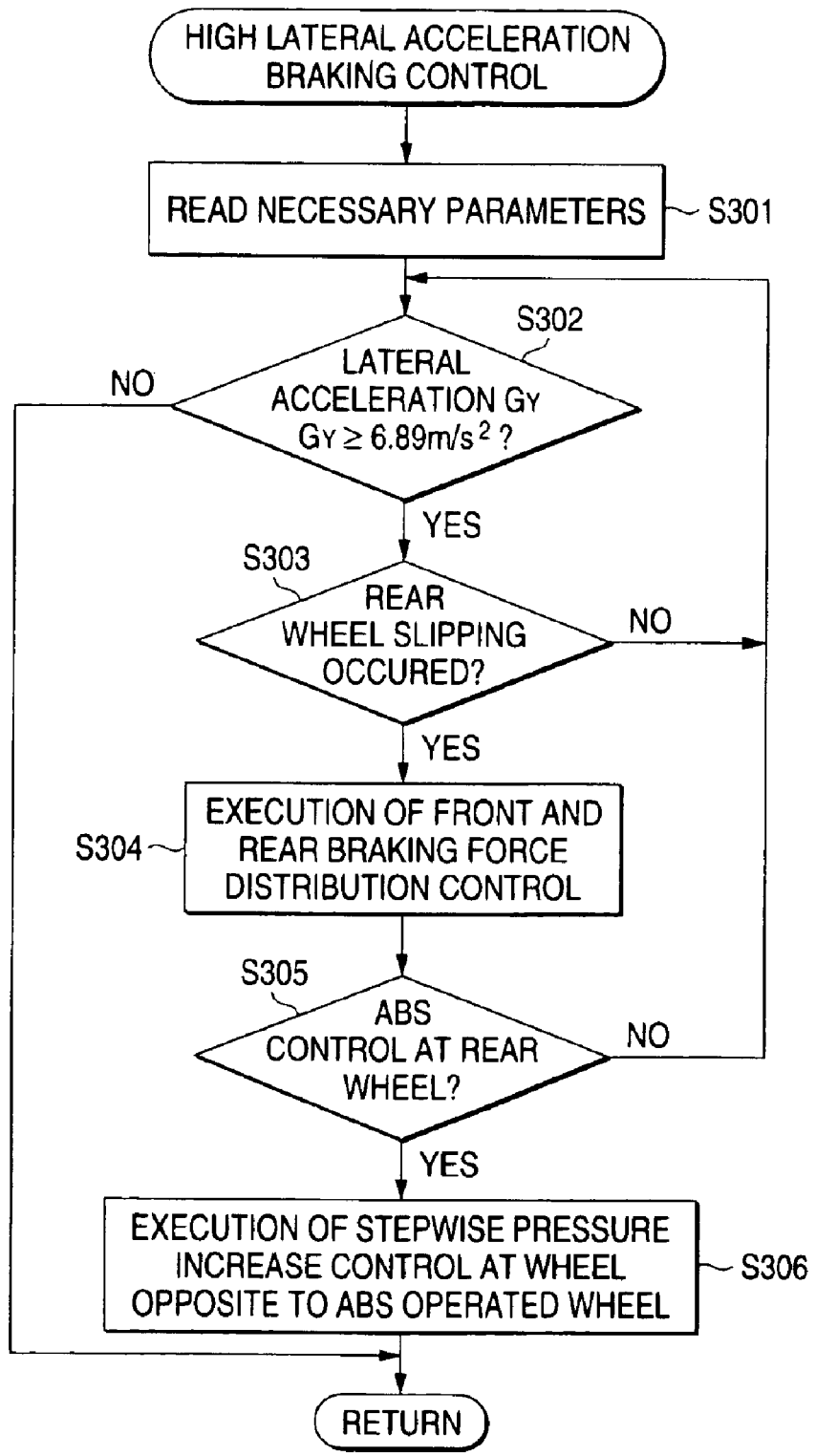
FIG. 5 is a flowchart of high lateral acceleration braking control according to a second embodiment of the present invention.
Figure 6:
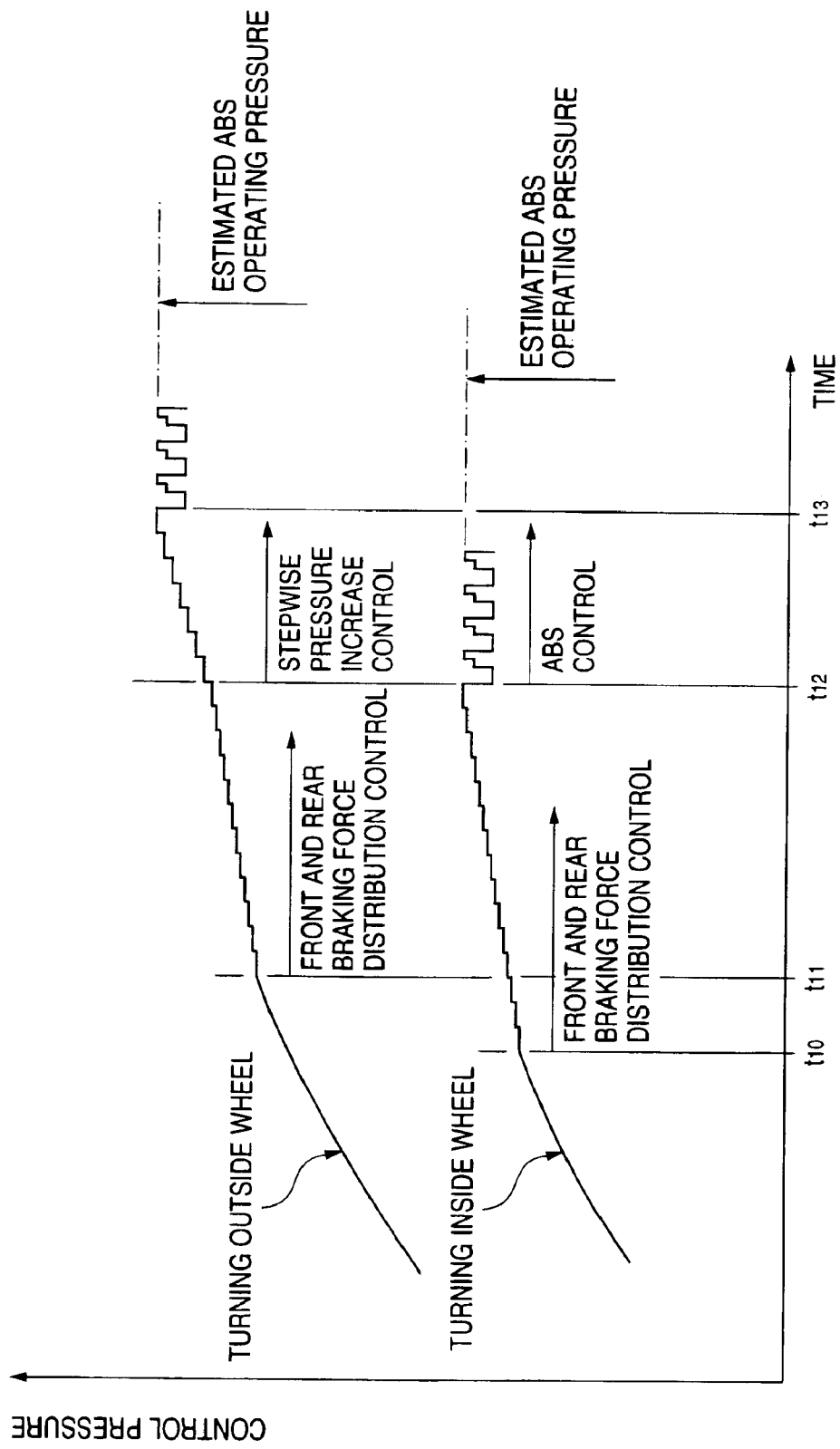
FIG. 6 is an explanatory diagram of variation in braking pressure with time at braking at a high lateral acceleration turning according to the same.

The high lateral acceleration braking control routine, as shown in the flowchart of FIG. 5, first reads necessary parameters at S301, namely the lateral acceleration Gy from the lateral acceleration sensor 8 and an ABS control operation signal indicating operation or non-operation of the ABS control, a signal indicating slipping conditions of the rear wheels (for example, differences between a vehicle speed V and respective rear wheel speeds), and the like.

Next to this, the execution goes to S302 where comparison is carried out between the lateral acceleration Gy and a lateral acceleration value set beforehand to be a reference for deciding the high lateral acceleration value (for example, 6.89 m/s$^2$). With the lateral acceleration Gy being below 6.89 m/s$^2$, the execution just goes out of the routine and proceeds to S102.

On the other hand, when the lateral acceleration Gy is decided to be 6.89 m/s$^2$ or above as being in high lateral acceleration running at S302, the execution goes to S303 where a decision is made as to whether a slip occurs at any one of the right and left rear wheels or not (for example, whether a difference between a vehicle speed V and each of the rear wheel speeds exceeds a threshold value set beforehand or not). When no slip occurs at any of the right and left rear wheels, the execution returns to S302. When the slip occurs at any one of the right and left rear wheels, the execution goes to S304.

With the decision made at S303 as the slip occurs at any one of the right and left rear wheels, the execution going to S304 carries out front and rear braking force distribution control which adequately distributes braking force between the front and rear wheels for the rear wheel at which the slip occurs.

When the lateral acceleration Gy is in a high region set beforehand, the above-described front and rear braking force distribution control, under a condition set beforehand, for example, is executed by selecting depending on the vehicle speed V either a select low control, which controls braking forces of the right and left wheels in accordance with a wheel on the side with a large slipping state, or independent braking control, which independently controls the braking force of each of the wheels depending on the slipping condition thereof. When the lateral acceleration Gy is in an intermediate region set beforehand, the braking force distribution control is executed by selecting depending on the vehicle speed V and a longitudinal acceleration Gx either the select low control or the independent braking control. When the lateral acceleration Gy is in a low region set beforehand, the braking force distribution control is executed by selecting the select low control.

The select low control and the independent braking control carry out control of pressure holding, pressure increasing and pressure decreasing depending on, for example, a speed difference between the front and rear wheels. By setting a threshold value for the pressure holding, a threshold value for the pressure decrease, and a threshold value for the pressure increase beforehand, the braking pressure is held when the speed difference between the front and the rear wheels becomes equal to or above the threshold value for the pressure holding, the pressure decrease control of the braking pressure is carried out when the speed difference becomes equal to or above the threshold value for the pressure decrease, and the pressure increase control of the braking pressure is carried out when the speed difference is below the threshold value for the pressure increase.

Thereafter, the execution goes to S305 where a decision is made as to whether the ABS control is operated at any one of the right and left rear wheels or not. When no ABS control is operated at any of the right and left rear wheels, the execution returns to S302. When the ABS control is operated at any one of the right and left rear wheels, the execution goes to S306.

The execution going to S306 stops the front and rear braking force distribution control for the other wheel without ABS control operation and carries out a stepwise pressure increase control. The stepwise pressure increase control provides a step wise pressure increase for the other wheel without ABS control operation up to a braking pressure to be reached (for example, an estimated ABS operating pressure), by finely repeating pressure increasing and holding only at a start of the control. After the stepwise pressure increase control, the execution goes out of the routine.

Under the above-described braking control, an example of variation in a braking pressure with time at braking at a high lateral acceleration turning will be explained with reference to FIG. 6. In the example, the surface condition of a road (for example, a road surface friction) is taken as being the same on the right wheel side and the left wheel side of the vehicle.

First, a vehicle just going to be braked in turning normally brings a turning inside wheel into a slipping condition easier than a turning outside wheel because the more vertical load of the vehicle is transferred to the turning outside wheel side. Thus, from a time t10 in the diagram, the front and rear braking force distribution control is carried out at the turning inside wheel to provide adequate braking. Then, at the time t11, a slip occurs on the side of the turning outside wheel, where the front and rear braking force distribution control is also carried out to provide an adequate braking operation.

Thereafter, with the time reaching a time t12, when the ABS control is operated at the turning inside wheel, the stepwise pressure increase control is executed at the turning outside wheel to be executed from the time t12, by which a braking pressure is increased stepwise up to an estimated ABS operating pressure.

Then, with the time coming at a time t13, the ABS control is executed also at the turning outside wheel. Therefore, also in the second embodiment, no sudden impact due to a high vertical load is caused when the ABS control is operated at the turning outside wheel to prevent the occurrence of unpleasant rolling behavior and allow a natural, reliable, and stable braking to be performed. Moreover, this can be applied by only changing the software side of a conventional ABS control, so that the realization thereof is allowed without any particular addition of complicated mechanism. Furthermore, since the front and rear braking force distribution is executed before the ABS control, the tires do not lose grip forces to allow an adequate braking to be performed in stable.

As explained above, according to the present invention, a natural, reliable, and stable braking is obtained by preventing unpleasant rolling behavior from occurrence without any particular addition of complicated mechanism when turning with a high lateral acceleration in a vehicle which carries out braking control of each of the right an left wheels.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A braking force control system of a vehicle, comprising:
   a lateral acceleration detecting unit for detecting a lateral acceleration of the vehicle; and
   a braking control unit carrying out an anti-lock braking control and carrying out an independent braking control of right and left rear wheels,
   wherein said braking control unit executes a braking force distribution control between front and rear wheels when said lateral acceleration exceeds a lateral acceleration value set beforehand,
   and said braking control unit stops said front and rear braking force distribution control of a first rear wheel and executes a stepwise pressure increase control of said first rear wheel when said anti-lock braking control is operated at a second rear wheel,
   said stepwise pressure increase control for providing a stepwise pressure increase up to a braking pressure to be reached at the start of the control of the braking control unit at the first rear wheel.

2. The braking force control system of a vehicle as claimed in claim 1, wherein said front and rear braking force distribution control is started and executed depending on a slipping condition of the rear wheel.

3. The braking force control system of a vehicle as claimed in claim 1, wherein said front and rear braking force distribution control is executed by selecting one of a select low control controlling braking forces of wheels in accordance with a wheel on the side with a large slipping state, and an independent braking control independently controlling the braking forces of the wheels depending on the slipping state thereof in accordance with the lateral acceleration, a longitudinal acceleration and a vehicle speed.

4. A braking force control method of a vehicle having a braking control unit carrying out an anti-lock braking control and carrying out an independent braking control of right and left rear wheels, said method comprising the steps of:
   detecting a lateral acceleration of the vehicle; and
   executing a braking force distribution control between front and rear wheels when said lateral acceleration exceeds a lateral acceleration value set beforehand; and executing, when said anti-lock braking control is operated at a first rear wheel, a stepwise pressure increase control at a second rear wheel after stopping said front and rear braking force distribution control of said front and rear wheels, said stepwise pressure increase control providing a stepwise pressure increase up to a braking pressure to be reached at a start of the anti-lock braking control of the vehicle.

5. The braking force control method of a vehicle as claimed in claim 4, wherein said front and rear braking force distribution control is started and executed depending on a slipping condition of the rear wheel.

6. The braking force control method of a vehicle as claimed in claim 4, wherein said front and rear braking force distribution control is executed by selecting one of a select low control controlling braking forces of wheels in accordance with a wheel on the side with a large slipping state, and an independent braking control independently controlling the braking forces of the wheels depending on the slipping state thereof in accordance with the lateral acceleration, a longitudinal acceleration and a vehicle speed.

7. A braking force control system of a vehicle, comprising:
   a lateral acceleration detecting unit for detecting a lateral acceleration of the vehicle; and
   a braking control unit for carrying out an anti-lock braking control and carrying out an independent braking control of right and left rear wheels,
   wherein said braking control unit executes a braking force distribution control between front and rear wheels when said lateral acceleration exceeds a lateral acceleration value set beforehand, and said braking control unit stops said front and rear braking force distribution control of one of said rear wheels and executes a stepwise pressure increase control on said one of said rear wheels when said anti-lock braking control is operated at the other of said rear wheels, said stepwise pressure increase control being in a plurality of steps of increasing and holding pressure and providing a stepwise pressure increase up to a braking pressure to be reached at a start of the control of the braking force.

8. The braking force control system of a vehicle as claimed in claim 7, wherein said front and rear braking force distribution control is started and executed depending on a slipping condition of the rear wheel.

9. The braking force control system of a vehicle as claimed in claim 7, wherein said front and rear braking force distribution control is executed by selecting one of a select low control controlling braking forces of wheels in accordance with a wheel on the side with a large slipping state, and an independent braking control independently controlling the braking forces of the wheels depending on the slipping state thereof in accordance with the lateral acceleration, a longitudinal acceleration and a vehicle speed.

* * * * *